Jan. 28, 1936.    F. G. HUGHES    2,029,072
ANTIFRICTION BEARING AND SEAL
Filed April 17, 1934
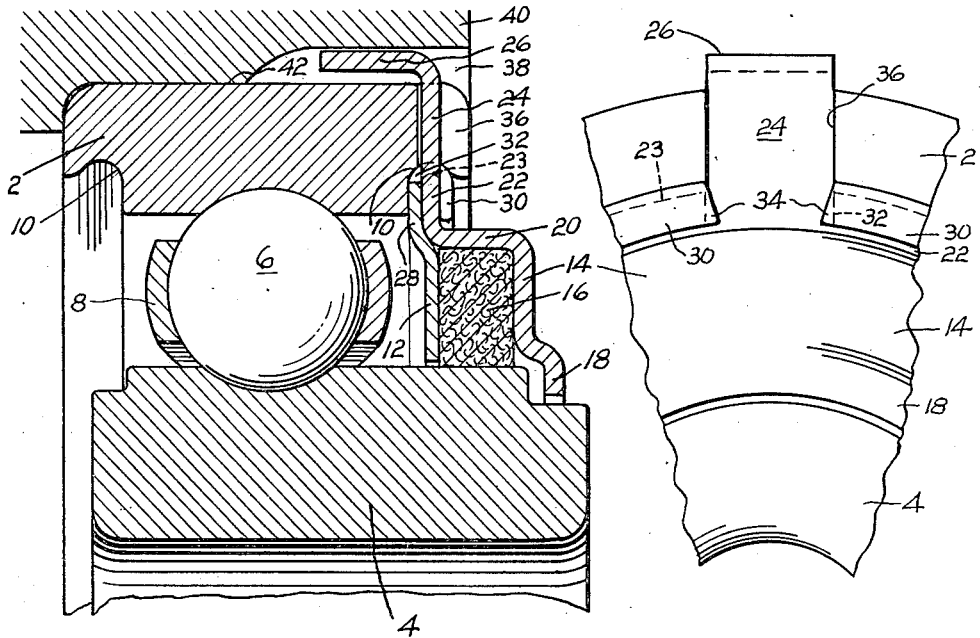
FIG. 1
FIG. 2
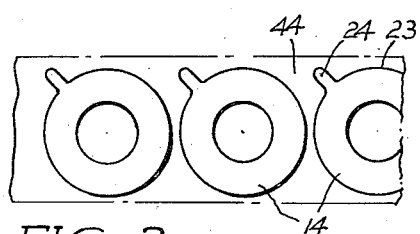
FIG. 3
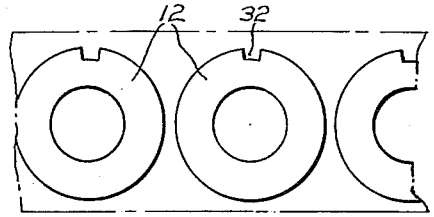
FIG. 4
INVENTOR:
FREDERICK G. HUGHES,
BY
HIS ATTORNEY.

Patented Jan. 28, 1936

2,029,072

UNITED STATES PATENT OFFICE 2,029,072

ANTIFRICTION BEARING AND SEAL

Frederick G. Hughes, Bristol, Conn., assignor to General Motors Corporation, Detroit, Mich., a corporation of Delaware Application April 17, 1934, Serial No. 720,987

13 Claims. (Cl. 308—187)

This invention relates to antifriction bearings and seals and comprises all of the features of novelty herein disclosed. An object of the invention is to provide a combined seal and key for bearings and the like. Other objects are to provide improved means for keying a bearing from rotation with respect to its seat, for keying a seal from rotation with respect to a bearing, for keying the parts of a seal from relative rotation, and for preventing relative rotation between any or all of the foregoing things.

To these ends and also to improve generally upon devices of this character, the invention consists in the various matters hereienafter described and claimed. In its broader aspects the invention is not necessarily limited to the specific construction selected for illustrative purposes in the accompanying drawing in which Fig. 1 is a cross sectional view, enlarged, of a portion of a sealed bearing keyed in a bearing seat.

Fig. 2 is a side elevation of parts shown in Fig. 1.

Figs. 3 and 4 are plan views of the blanks for forming the seal, such views further indicating an economical way of cutting the blanks from narrow strips of metal.

The numeral 2 indicates the outer race ring of an antifriction bearing having a co-operating inner race ring 4, a series of rolling elements 6, and a separator 8. The race ring 2 may carry suitable sealing means or closures at either or both ends and for this purpose is provided with annular grooves 10. The sealing means illustrated comprises dished plates or washers 12 and 14 enclosing a felt seal 16 which runs on a finished peripheral face of the inner race ring 4. An offset portion 18 of the washer 14 extends into a groove of the inner race ring to make the seal more efficient.

The washer 14 has an axially extending wall 20 with an outwardly projecting flange 22. The flange 22 has its outer edge 23 arcuate except where an extension or tab 24 extends radially outward to terminate in a lateral bend or keying extension 26. The other washer 12 is dished with respect to its outer portion 28 which has a flange 30 folded over the arcuate edge 23 to expand the flange 30 into holding engagement with the groove 10. The flange 30 is arcuate except where its outer edge is notched or recessed as at 32 to receive the tab 24. Thus the washers are keyed from relative rotation. When the arcuate flange 30 is folded over the edge 23, its terminal portions 34 at the notch 32 tend to approach and overlap the outside of the tab 24. A radial slot 36 in the end of the outer race ring 2 intersects the groove 10 and the tab 24 extends outwardly through the slot, thus keying the seal against rotation with respect to the race ring. The bend or extension 26 is adapted to enter a slot 38 in a support or casing 40 which has a suitable seat 42 for the bearing. Thus the bearing and the casing are keyed against relative rotation or creep. Such undesirable creep tends to create looseness and vibration and is induced in part by the drag of the felt seal 16 on the inner race ring.

As indicated in Figs. 3 and 4, no waste of metal is involved in cutting out the washers 12 and 14 from a strip which is but little wider than the diameter of the washers. The blanking dies are arranged so that the tabs 24 are inclined into the wider areas 44 intervening between the washers 14 near one edge of the strip.

I claim:

1. In a device of the character described, a race ring, a closure carried by the race ring, a keying member connected to the closure and interlocking with the race ring, and the keying member having a projection extended beyond the race ring; substantially as described.

2. In a device of the character described, a race ring, a closure carried by the race ring, said race ring having a radial slot, and a tab extended radially from the closure through and beyond the slot; substantially as described.

3. In a device of the character described, a race ring, a closure carried by the race ring, said race ring having a slot, a tab extended from the closure through the slot, and a keying extension on the tab; substantially as described.

4. In a device of the character described, a race ring having a slot, a keying member carried by the race ring and projecting through the slot, and a lateral projection extending from the keying member along the race ring; substantially as described.

5. In a device of the character described, a race ring, a closure carried by the race ring and comprising a pair of plates, one of the plates being folded over the other, and interlocking means at the folded portion for keying the plates against relative rotation; substantially as described.

6. In a device of the character described, a race ring, a closure carried by the race ring and comprising a pair of plates, and one of said plates having a radially projecting tab entering a peripheral notch in the other; substantially as described.

7. In a device of the character described, a race ring, a closure carried by the race ring and comprising a pair of plates, means for keying said plates together, and means for keying one of the plates to the race ring; substantially as described.

8. In a device of the character described, a race ring, a closure carried by the race ring and comprising a pair of plates, means for keying said plates together, means for keying one of the plates to the race ring, and means for keying the race ring to a support; substantially as described.

9. In a device of the character described, a race ring, a closure carried by the race ring and comprising a pair of plates, means for keying the plates together, and said means having an extension for keying the race ring to a support; substantially as described.

10. In a device of the character described, a race ring, a closure carried by the race ring and comprising a pair of plates, one of said plates having a tab entering a notch in the other, the race ring having a slot, and the tab extending into the slot; substantially as described.

11. In a device of the character described, a race ring, a closure carried by the race ring and comprising a pair of plates, one of said plates having a tab entering a notch in the other, the race ring having a slot, and the tab extending through the slot and having a projection beyond the race ring; substantially as described.

12. In a device of the character described, a race ring having an annular groove and a radial slot intersecting the groove, a closure comprising a pair of washers, one of the washers being notched and folded over the other with the fold entering the groove, and the other washer having a tab extended through the notch into the radial slot; substantially as described.

13. In a device of the character described, a race ring, a closure carried by the race ring and comprising a pair of washers, one of the washers being notched and folded over the other, the other washer having a tab extending through the notch, and means for securing the closure to the race ring; substantially as described.

FREDERICK G. HUGHES.